United States Patent [19]

Bayer et al.

[11] Patent Number: 5,051,379

[45] Date of Patent: Sep. 24, 1991

[54] METHOD OF PRODUCING MICROMECHANICAL SENSORS FOR THE AFM/STM PROFILOMETRY AND MICROMECHANICAL AFM/STM SENSOR HEAD

[75] Inventors: Thomas Bayer, Sindelfingen; Johann Greschner, Pliezhausen; Georg Kraus, Wildberg; Helga Weiss, Boeblinge; Olaf Wolter, Aidlingen, all of Fed. Rep. of Germany

[73] Assignee: International Business Machines Corporation, Armonk, N.Y.

[21] Appl. No.: 568,306

[22] Filed: Aug. 16, 1990

[30] Foreign Application Priority Data

Aug. 16, 1989 [EP] European Pat. Off. ........ 89115100.3

[51] Int. Cl.$^5$ .......................................... H01L 21/302
[52] U.S. Cl. ................................ 437/225; 437/228; 437/974; 437/8; 250/306; 250/307; 156/643
[58] Field of Search ................... 437/7, 8, 9, 974, 228, 437/170; 250/306, 307; 156/643

[56] References Cited

U.S. PATENT DOCUMENTS

| | | | |
|---|---|---|---|
| 4,668,865 | 5/1987 | Gimzewski et al. | 250/306 |
| 4,806,755 | 2/1989 | Duerig et al. | 250/306 |
| 4,883,959 | 11/1989 | Hosoki et al. | 250/306 |
| 4,906,840 | 3/1990 | Zdeblick et al. | 250/306 |
| 4,943,719 | 7/1990 | Akamine et al. | 250/306 |
| 4,968,585 | 11/1990 | Albrecht et al. | 156/654 |
| 4,998,016 | 3/1991 | Nose et al. | 250/307 |

FOREIGN PATENT DOCUMENTS 223918 6/1987 European Pat. Off. .

OTHER PUBLICATIONS

N. F. Raley et al., "Vertical Silicon Membranes for Super-Schottky Diodes", IEEE, vol. MAG-19, No. 3, Part 1, May 1983, pp. 507-511.

D. K. Biegelsen et al., "Ion Milled Tips for Scanning Tunneling Microscopy", vol. 50, No. 11, Mar. 16, 1987, pp. 696-698.

O. Marti et al., "Atomic Force Microscopy and Scanning Tunneling Microscopy with a Combination Atomic Force Microscope/Scanning Tunneling Microscope", J. Vac. Sci & Tech. Section A, vol. 6, No. 3, Part II, 2nd Series, May/Jun. 1988, pp. 2089-2092.

R. D. Jolly et al., "Miniature Cantiliver Beams Fabricated by Anisotropic Etching of Silicon" J. Electrochem, Soc., Solid-State Science and Technology, vol. 127, No. 12, Dec. 1980, pp. 2750-2754.

Petersen, K.E., "Dynamic Micromechanics on Silicon: Techniques and Devices" vol. ED-25, No. 10, Oct., 1978, pp. 1241-1250.

Petersen, K.E., "Silicon as a Mechanical Material", Proc. of the IEEE, vol. 70, No. 5, May 1982, pp. 420-457.

A. C. Adams, "Plasma Deposition of Inorganic Films", Solid State Technology, Apr. 1983, pp. 135-139.

C. Binning et al., "Atomic Force Microscope", Phys. Rev. Lett. 56, 1986, 930-933.

(List continued on next page.)

Primary Examiner—Brian E. Hearn
Assistant Examiner—Trung Dang
Attorney, Agent, or Firm—Robert M. Trepp

[57] ABSTRACT

A method and apparatus is described for a micromechanical sensor for the AFM/STM profilometry, which consist of a cantilever beam with a tip at its end and a mounting block at the opposite end. The method incorporated the steps of coating a wafer substrate; producing a mask for the desired cantilever beam pattern on the top side of the wafer; and a mask on the bottom side of the wafer; planarizing said cantilever beam pattern with photoresist; producing a mask for the desired tip in the area of the cantilever beam pattern producing the desired tip using an etching step, and simultaneously transferring the cantilever beam pattern from the upper to the lower part of the layer; and removing the supporting wafer material by etching through the bottom side mask. A mask for the desired cantilever beam pattern and the tip pattern contains all relevant information for a subsequent substrate etching process is described for etching step by step into a silicon substrate.

20 Claims, 4 Drawing Sheets

OTHER PUBLICATIONS

U. T. Duerig et al., "Experimental Observation of Forces Acting During Scanning Tunneling Microscopy", Phys. Rev. Lett., 57, 1986, 2403–2406.

Y. Martin et al., "Atomic Force Microscope–Force Mapping and Profiling on a Sub 100–A Scale", J. Appl. 61(10) 1987, 4723–4729.

T. R. Albrecht et al., "Atomic Resolution with the Atomic Force Microscope on Conductors and Nonconductors", J. Vac. Sci. Technol. A 6(2), Mar./Apr. 1988, pp. 271–274.

C. R. Guarnieri et al., "Fabrication of an Improved Membrane Substrate", IBM Tech. Disclosure Bulletin, vol. 24, No. 12, May 1982, pp. 6270–6271.

H. B. Pogge et al., "Reactive Ion Etching of Silicon with CI2 Ar(1)" J. Electrochemical Soc., vol. 130, No. 7, Jul. 1983, pp. 1592–1597.

METHOD OF PRODUCING MICROMECHANICAL SENSORS FOR THE AFM/STM PROFILOMETRY AND MICROMECHANICAL AFM/STM SENSOR HEAD

BACKGROUND OF THE INVENTION

1. Field of the Invention

The present invention relates to a method of producing micromechanical sensors for the AFM/STM profilometry, which consist of a cantilever beam with a tip at its end and a mounting block at the opposite end. The invention also relates to a sensor head made in accordance with the method of the invention.

2. Description of the Prior Art

The scanning tunneling microscope (hereafter abbreviated STM) has stimulated the development of new techniques for microcharacterization of materials which are based on the use of a very fine tip. One of these techniques involves the atomic force microscope (hereafter abbreviated AFM) which has recently demonstrated the capability to profile and image conductors and insulators.

In the initial design of the AFM which was described by Binnig et al. "Atomic Force Microscope", Phys. Rev. Lett. 56, 1986, pp 930-933 and in European patent document EP-A-0 223 918, a sensor consisting of a spring-like cantilever which is rigidly mounted at one end and carries at its free end a dielectric tip profiles the surface of an object. The force between the object's surface and the tip deflects the cantilever, and this deflection can be accurately measured, for example by a second tip which is part of an STM. A lateral spatial resolution of 3 nm has initially been achieved.

Another version of the AFM includes optical detection instead of an STM detection. In this version a tungsten tip at the end of a wire is mounted on a piezoelectric transducer. The transducer vibrates the tip at the resonance frequency of the wire which acts as a cantilever, and a laser heterodyne interferometer accurately measures the amplitude of the a. c. vibration. The gradient of the force between the tip and sample modifies the compliance of the lever, hence inducing a change in vibration amplitude due to the shift of the lever resonance. Knowing the lever characteristics, one can measure the vibration amplitude as a function of the tip-sample spacing in order to deduce the gradient of the force, and thus, the force itself (Duerig UT, Gimzewski JK, Pohl DW (1986) Experimental Observation of Forces Acting During Scanning Tunneling Microscopy, Phys. Rev. Lett. 57, 2403-2406; and Martin Y, Williams CC Wickramasinghe HK (1987) Atomic Force Microscope-Force Mapping and Profiling on a sub 100-A Scale, J. Appl. Phys. 61(10), 4723-4729).

A most critical component in the AFM is the spring-like cantilever. As a maximum deflection for a given force is needed a cantilever is required which is as soft as possible. At the same time a stiff cantilever with a high eigenfrequency is necessary in order to minimize the sensitivity to vibrational noise from the building. Usually, ambient vibrations, mainly building vibrations, are of the order of <100 Hertz. If the cantilever is chosen such that it has an eigenfrequency $f_o \geq 10$ kHz, the ambient vibrations will be attenuated to a negligible value. These requirements can only be met by reducing the geometrical dimensions of the cantilever as reflected by the following two equations:

The eigenfrequency fo of the cantilever is given by $$f_o = 0.162 \frac{t}{l^2} \sqrt{\frac{E}{\rho} K} \quad (1)$$

wherein E is Young's modulus of elasticity, $\rho$ is the density, and K is a correction factor close to unity, l is the length, and t is the thickness of the cantilever.

The spring constant of the cantilever on which its sensitivity depends is given by $$C = \frac{F}{y} = \frac{E w t^3}{4 l^3} \quad (2)$$

wherein F is the force which causes the deflection y of the cantilever, E is Young's modulus of elasticity, w is the width, l is the length, and t is the thickness of the cantilever. In accordance with the spring constant term the sensitivity of the cantilever is dependent on its dimensions and on the material of which it consists, with the highest sensitivity being obtained for long, thin and narrow cantilever beams. The width of the cantilever beam should be sufficiently large so that lateral vibrations are suppressed. Also, the width of the beam should permit the fabrication of additional structures, such as tips, thereon. Therefore, a minimum width w of around 10 μm seems reasonable. In practice, C has to be about $\geq 1$ N/m in order to avoid instabilities during sensing of attractive forces, to prevent excessive thermal vibrations of the cantilever beam, and to obtain a measurable response.

Dimensions of a cantilever beam compatible with C=1 N/m, and $f_o$=10 kHz are for example: l=800 μm, w=75 μm and t=5.5 μm.

In the normal deflection mode of the cantilever beam forces in the order of $10^{-12}$ N can be detected. The sensitivity of the sensor head can be further enhanced by vibrating the object to be profiled at the resonance frequency fo of the cantilever beam, as described by G. Binnig et al. in Phys. Rev. Lett. 56 (1986), pp. 930-933.

In the AFM realized in accordance with the aforementioned Binnig et al article and with EP-A-0 223 918 the requirements for cantilever and tip were met by a gold foil of about 25 μm thickness, 800 μm length, and 250 μm width to which a diamond fragment was attached with a small amount of glue. Another proposal used microfabrication techniques to construct thin-film (1.5 μm thick) SiO2 microcantilevers with very low mass on which miniature cones could be grown by evaporation of material through a very small hole as described by Albrecht et al. "Atomic Resolution with the Atomic Force Microscope on Conductors and Nonconductors", J. Vac. Sci. Technol., 1988, pp. 271-274.

From the foregoing description of the state of the art it was known to construct, in a first process step, cantilevers, and, in a second process step, to attach tips thereto. It will be obvious to those skilled in the art that the construction of a cantilever with tip of that type is extremely delicate and prone to low yield.

The following publications relating to micromechanics are noted as examples of the prior art::

Petersen, KE, Dynamic Micromechanics on Silicon: Techniques and Devices, Vol. ED-25, No. 10, October 1978, pp. 1241-1250;

Petersen, KE, Silicon as a Mechanical Material, Proc. of the IEEE, Vol. 70, No. 5, May 1982, pp. 420-457; and Jolly, RD, Muller, RS, Miniature Cantilever Beams Fabricated by Anisotropic Etching of Silicon, J. Electrochem Soc.: Solid-State Science and Technology, December 1980, pp. 2750-2754.

SUMMARY OF THE INVENTION

With the method and apparatus of the present invention, low-mass microcantilever beams with integrated tips can be made carrying at one end a small piece of wafer for mounting the lever in the AFM, and at the opposite end an integrated tip for interaction with the surface of a sample to be profiled. The force and resonance frequency requirements of cantilever beam and integrated tip are met by using the microfabrication techniques. Due to the fact that cantilever and tip are made from one piece of material there are no adhesion problems between cantilever and tip.

It is, therefore, an object of the invention to teach a method for the construction of microcantilevers with integrated tips, which method uses a suitable combination of deposition, lithography, wet and dry etching process steps.

BRIEF DESCRIPTION OF THE DRAWINGS

Details of several embodiments of the present invention will be described by way of example with respect to the accompanying drawings in which.

DESCRIPTION OF THE PREFERRED EMBODIMENT

Figure 1:
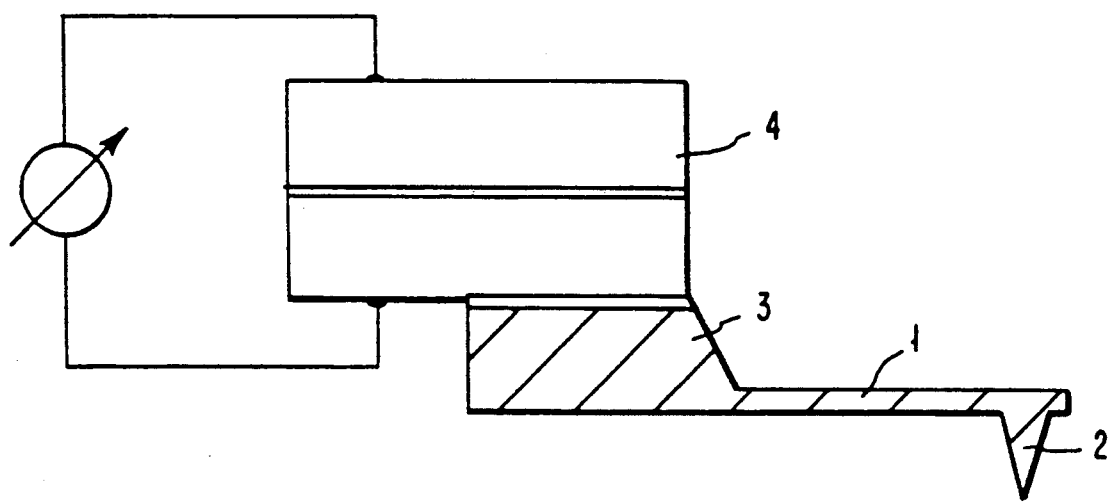
FIG. 1 shows a cantilever beam carrying at one end a piece of wafer which is rigidly mounted on a piezoelectric bimorph, and a sharply pointed tip at its free end.

Referring to FIG. 1, a cantilever beam (1) is shown carrying at one end a piece of wafer (3) which is rigidly mounted on a piezoelectric bimorph (4), and a sharply pointed tip (2) at its free end. Cantilever beam (1) and tip (2) may consist of any solid material such as $SiO_2$, $Si_3N_4$, SiC, doped monocrystalline silicon, and polycrystalline silicon, or of pure monocrystalline silicon.

In a first example a layer of solid material, preferably $SiO_2$, is applied to a silicon wafer, preferably a (110) wafer. By means of two photolithographic masks cantilever and tip will be defined, followed by suitable wet or dry etching process steps for their realization.

Some technological skill is necessary to make this process sequence successful, as can be seen from the following detailed process description of example 1 in accordance with FIGS. 2A-2E.

Figure 2A:
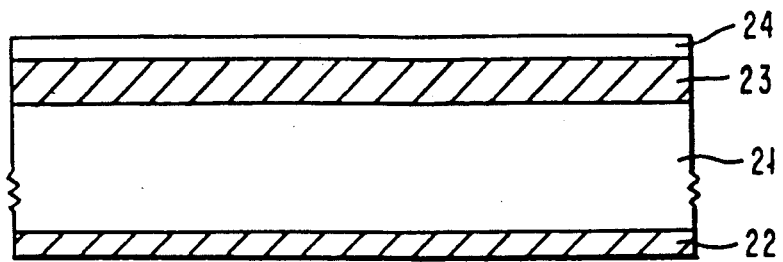
FIGS. 2A-2E show a sequence of process steps for making a cantilever beam with integrated tip which has been worked out of a layer of material arranged on a silicon wafer substrate, using photolithographic and etching steps.

FIG. 2A shows the original layer structure to start with. A (110) silicon wafer 21 is bilaterally coated with silicon dioxide. On the top side of the wafer SiO2 layer 23 is thermally grown or deposited by chemical vapor deposition. The preferred layer thickness is about 10 $\mu$m. On the bottom side of the wafer an about 1 to 2 $\mu$m thick $SiO_2$ layer 22 is thermally grown. An about 3 $\mu$m thick photoresist layer 24 is applied to the $SiO_2$ layer 23 on the top side of the wafer. Well-known positive acting photoresists, such as AZ 1350J of the Shipley Company, or negative acting photoresists can be used for this purpose.

In a first photolithographic step (not shown) the pattern of the cantilever beam 25 is defined in photoresist layer 24, which has a layer thickness of about 3 $\mu$m, and is subsequently transferred into the upper part of silicon dioxide layer 23 to a depth of about 3 $\mu$m by wet etching with 5:1 buffered hydro- fluoric acid or by reactive ion etching under the following process conditions:

etch gas: $CF_4$ pressure range: 1 to 10 $\mu$bar

Figure 2B:
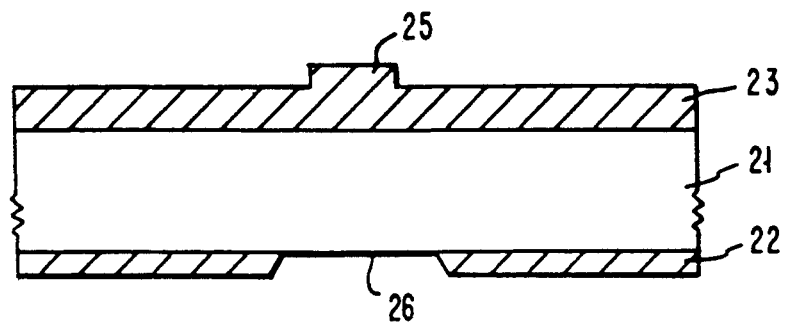

Concurrently with the aforedescribed photolithographic and reactive ion etching steps rectangular openings 26 are made in the oxide layer 22 on the bottom side of the wafer, with the respective masks on the bottom side of the wafer being in alignment with those on the top side. Next, the remaining photoresist is removed. The resulting structure is shown in FIG. 2B.

Figure 2C:
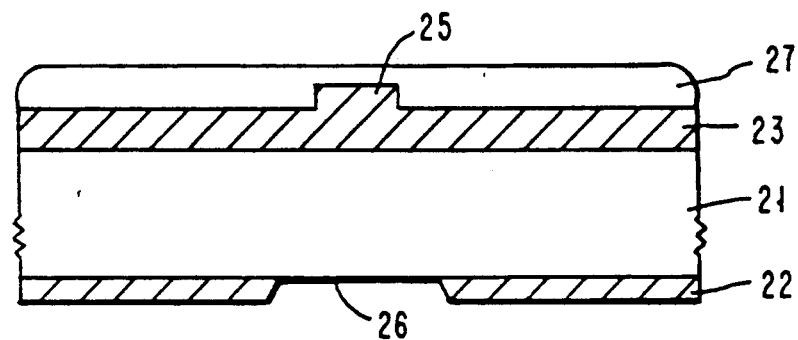

It is noted that it is extremely important to start with the cantilever beam mask and not with the tip mask, for only the cantilever beam mask can be completely planarized with photoresist. For planarization an about 5 $\mu$m thick photoresist layer 27 is applied to silicon dioxide layer 23 with cantilever beam pattern 25 as shown in FIG. 2C.

Figure 2D:
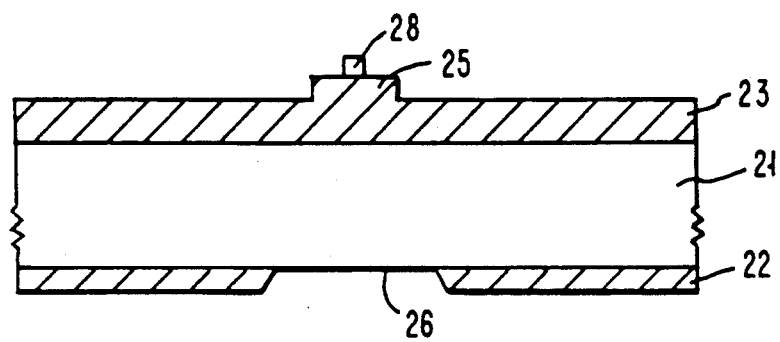

In a second photolithographic step the pattern of the tip 28 is defined in photoresist layer 27 over silicon dioxide cantilever 25 as shown in FIG. 2D. With this photoresist mask 28 on silicon dioxide cantilever 25, tip 29 is etched in a second step, e g. with 5:1 buffered hydrofluoric acid, or by reactive ion etching under the following process conditions:

| etch gas: | $CF_4$ |
| pressure: | 100 $\mu$bar |
| etch rate ratio resist:$SiO_2$: | 1:1 |

Figure 2E:
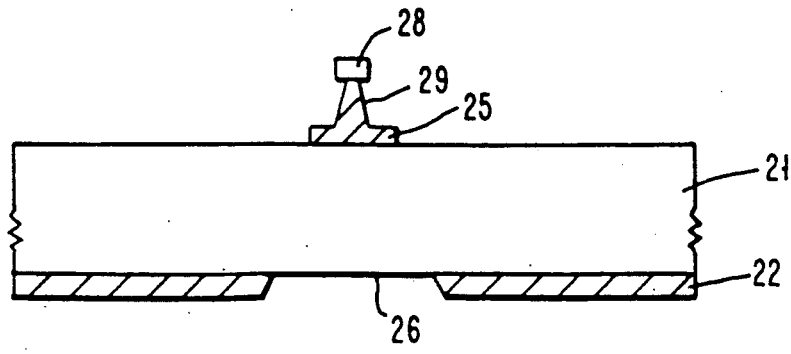

The resulting silicon dioxide tip 29 as shown in FIG. 2E has a length of about 5 to 7 $\mu$m.

The reactive ion etching step uses pressure/energy conditions which allow simultaneous anisotropic profile as well as undercut etching, with the consequence that the tip is shaped in length and diameter at the same time. Furthermore, a photoresist mask for shaping the silicon dioxide tip and a silicon dioxide 'intermediate mask' for creating the future silicon dioxide cantilever beam are used in the same reactive ion etching step.

Reactive ion etching is stopped when silicon dioxide 'intermediate mask' (25) and silicon dioxide layer (23) as shown in FIG. 2B are etched to such an extend that all silicon dioxide covering the top side of silicon wafer (21), apart from silicon dioxide cantilever beam (25) and tip (29), has been removed. The remaining photo-resist (28) is now removed, and the tip (29), if necessary, is sharpened in an argon ion milling process.

Figure 3A:
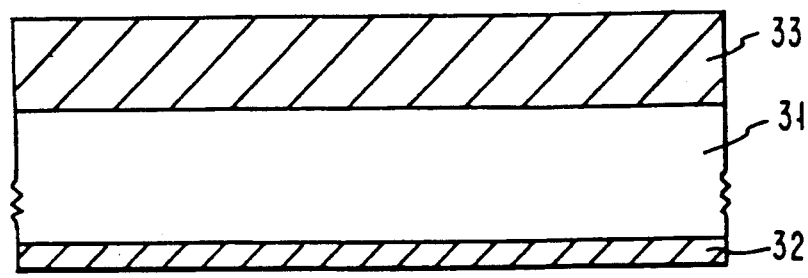
FIGS. 3A-3D represent side views of the process steps in accordance with FIGS. 2A-2E.
Figure 3B:
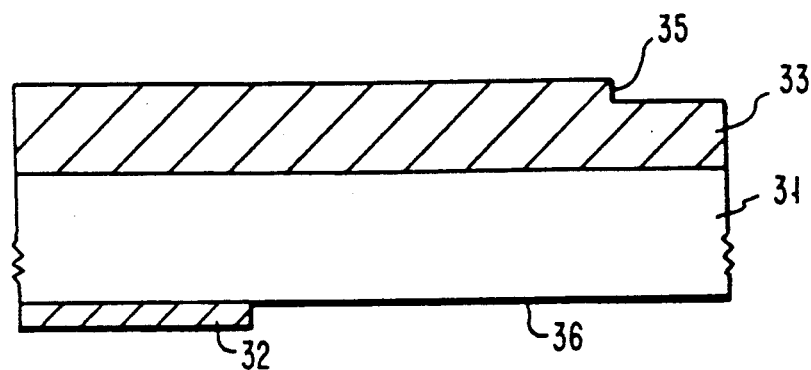
Figure 3C:
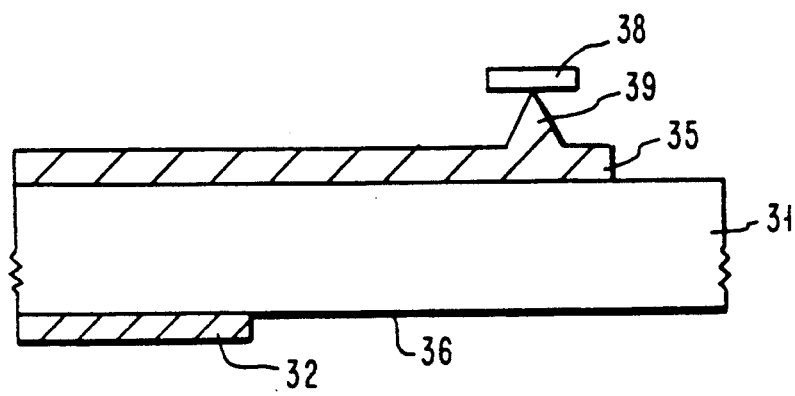
Figure 3D:
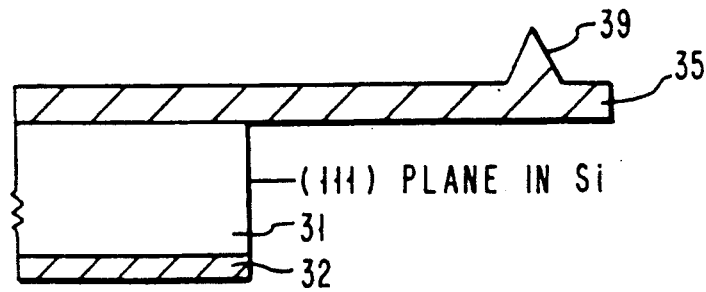

FIGS. 3A to 3C represent side views of the aforedescribed process with FIG. 3A corresponding to FIG. 2A, FIG. 3B to 2B, and FIG. 3C to 2E. As shown in FIG. 3D silicon wafer (31) supporting silicon dioxide cantilever beam (35) with tip (39) is removed by anisotropic silicon wet etching (in KOH) from the bottom side of the wafer. The use of (100) or (110) wafers as supporting wafers is preferred. The orientation and size of the openings (36) in the silicon dioxide layer (32) on the bottom side are chosen so that their edges define a volume of a (110) wafer bounded by (111) planes. Finally, a small piece of the wafer is cut out for mounting the cantilever on a piezoelectric bimorph as shown in FIG. 1.

A second example of the process of the invention is described in accordance with FIGS. 4A–4F.

This example relates to the development of an additional structure, such as a tip, on an already 3-dimensionally structured substrate, such as a cantilever beam. In this process problems arise for example when the flexible and fragile cantilever beams have to be coated with photoresist for subsequent exposure. These and other problems are solved in that a mask which is applied to a substrate is structured in such a manner that it contains all relevant information for the subsequent substrate etching process. This means that the structures of all lithography steps are etched one after the other into the mask before substrate etching. Subsequently, this information is transferred step by step from the mask into the substrate. Between two successive substrate etching process steps there is a mask etching step which does not require an additional lithography step however. This multiple step mask can be fabricated in conventional planar technology. A further advantage is that there are no problems with respect to photoresist coverage and exposure as the mask has a thickness of only a few $\mu$m. The process benefits from the high selectivity of mask versus substrate in the substrate etching process which can comprise wet and/or dry etching steps, respectively.

Figure 4A:
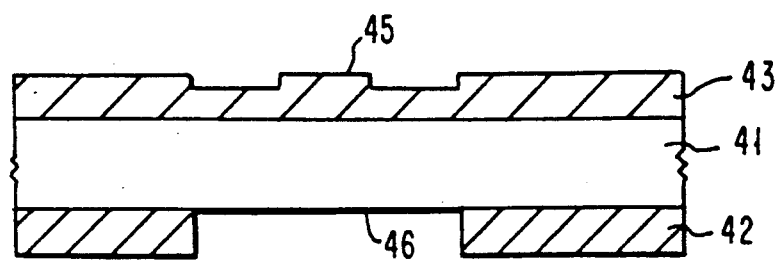
FIGS. 4A-4F show a sequence of process steps for making a cantilever beam with integrated tip which has been worked out of a silicon wafer substrate, using a mask with two levels of information, and photolithographic and etching steps.

As shown in FIG. 4A a (100) silicon wafer (41) is bilaterally coated with silicon dioxide. The oxide layers (43) and (42) on the top side and on the bottom side are thermally grown to a layer thickness of about 3 $\mu$m. In a first photolithographic step the patterns of cantilever beam (45) and of rectangular openings (46) are defined. For this purpose AZ 1350 positive photoresist is bilaterally applied to the oxide coated wafer (not shown). The photoresist layers on both sides are exposed at the same time and developed. The oxide on both sides is etched in 5:1 buffered hydrofluoric acid or by reactive ion etching for a time depending on the desired etch depth on the top side. Next, the top side is protected by a baked photoresist layer, and the oxide residue in the exposed areas (46) on the bottom side of the wafer is removed by etching in 5:1 buffered hydrofluoric acid. The resulting structure is shown in FIG. 4A.

Figure 4B:
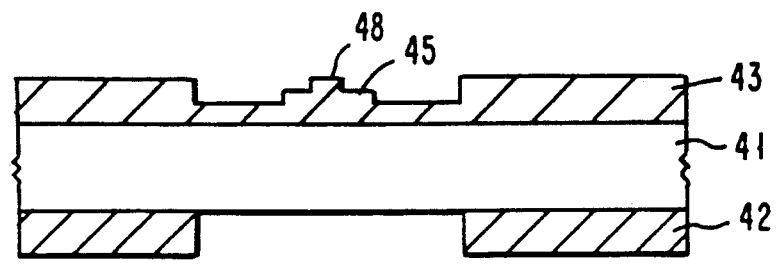

In a second photolithographic step the pattern of the tip is defined in a newly applied photoresist layer over silicon dioxide cantilever pattern (45) (not shown). The photoresist tip pattern is transferred into the silicon dioxide by etching in 5:1 buffered hydrofluoric acid or by reactive ion etching. During this etching step the cantilever beam pattern is transferred to a deeper level of layer (43), and the thickness of the remaining silicon dioxide layer (43) is reduced correspondingly. The bottom side of the wafer is protected by a baked photoresist layer during this step. The resulting silicon dioxide mask structure (45, 48) which will then be transferred step by step into the silicon substrate (41) is shown in FIG. 4B.

Prior to this mask structure transfer, the silicon wafer (41) is thinned down by etching from the bottom side to a thickness which corresponds to about twice the thickness of the cantilever beam plus twice the height of the tip plus about 10 $\mu$m residual thickness. This etching step which uses an about 37.5 wt % aqueous KOH solution at about 80° C. is anisotropic. The resulting structure is shown in FIG. 4C.

Figure 4C:
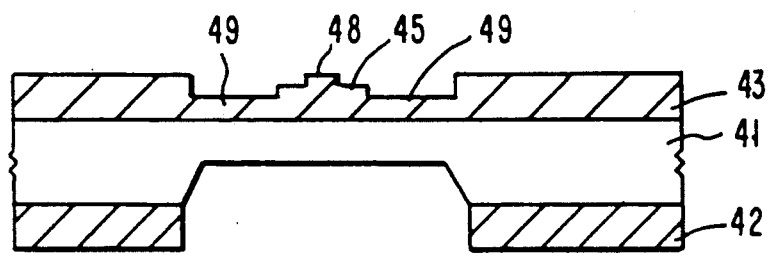
Figure 4D:
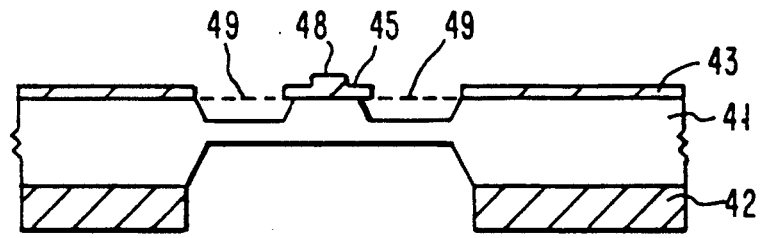

Next, as shown in FIGS. 4C and 4D, silicon dioxide layer (43) with structures (45) and (48) is etched in 5:1 buffered hydrofluoric acid or by reactive ion etching to such a depth, that the silicon dioxide areas 49) abutting cantilever beam mask (45) are removed. An anisotropic wet etching step with aqueous KOH solution under the aforespecified conditions follows for the transfer of the cantilever beam pattern (45) into the silicon wafer (41). This step removes the areas of silicon wafer (41) originally underlying silicon dioxide areas (49) in a depth which corresponds to the desired silicon cantilever beam thickness. At the same time the wafer is correspondingly thinned down from the bottom side.

Now, silicon dioxide cantilever beam mask (45) and remaining silicon dioxide areas (43) are removed by etching in 5:1 buffered hydrofluoric acid or by reactive ion etching. The following etching of the tip with a lateral etching speed, in 37.5 wt % KOH solution at about 60° C. about twice as high as the etching speed in depth is the most time critical step of the whole etching cycle. Therefore, a careful survey by optical inspection is indispensable.

The etch depth $H_{tip}$ is given by the empirical formula shown in equation 3

$$H = \frac{1}{3.6} \phi \text{ tip} \qquad (3)$$

($\phi$ tip = diameter of tip mask)

Figure 4E:
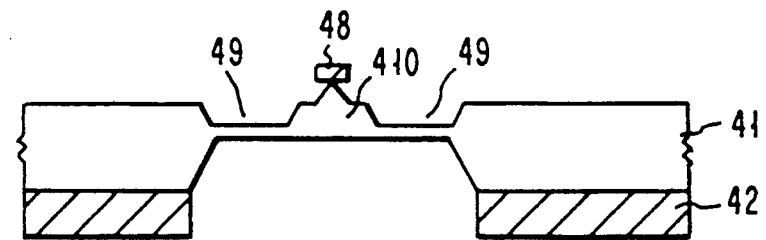
Figure 4F:
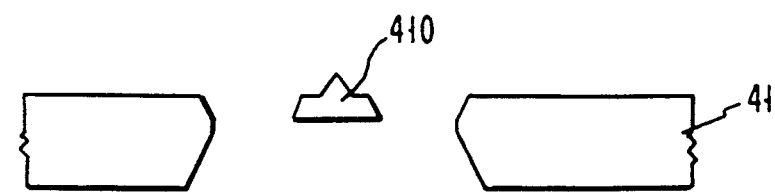

At the end of the tip etching the silicon dioxide tip mask (48) falls off silicon tip (410). The tip etching is shown in FIG. 4E.

The remaining silicon membrane (41) in the areas (49) is now etched from the bottom side of the wafer. This etching step comprises reactive ion etching, using CF4 as etch gas and a pressure of about 10 $\mu$bar, without affecting the top side of the silicon structure.

The aforedescribed etching process provides for a micromechanical single crystal silicon structure consisting of a cantilever beam with an integrated tip pointing into the (100) direction. The tip radius is <10 nm, a value which has never been attained before. The cantilever beam thickness is in the 1 $\mu$m to 20 $\mu$m range, and the cantilever beam spring constant in the 1 N/m to 100 N/m range. Cantilevers with these properties are preferably used in the AFM.

A third example describes a process for making mono-crystalline monolithic silicon tips. The respective tips can be made with a height of about 20 $\mu$m or 2 $\mu$m, depending on the orientation of the tip.

For profiling sample surfaces with a STM these tips have to be spaced very closely in relation to the sample surface. The tip should quite clearly protrude from its mounting in order to avoid contact between sample and mounting elsewhere. Therefore, it is desirable to set these tips e.g. on a pedestal.

To realize this an about 2 $\mu$m thick silicon dioxide layer is thermally grown on a (100) silicon wafer. In a first photolithographic step 500 $\mu$m diameter discs are defined in the silicon dioxide layer in an array. These discs are to form the etch masks for the silicon pedestals. The oxide is etched in 5:1 buffered hydrofluoric acid to a depth of about 1.1 μm. In a second photolithographic step 80 μm diameter discs are defined in the silicon dioxide overlying the 500 μm diameter discs. These discs of smaller diameter are to form the etch masks for the silicon tips. The oxide is etched in 5:1 buffered hydrofluoric acid to a depth of about 1.1 μm. The resulting silicon dioxide mask which corresponds to the mask shown in FIG. 4B of the previous example will now be transferred step by step into the silicon substrate.

In a first step the pedestal is etched into the wafer to a depth of e.g. 150 μm. This step comprises anisotropic wet etching with aqueous KOH solution. Next, the mask for the pedestal (first level of information of the silicon dioxide mask) is removed by etching in 5:1 buffered hydrofluoric acid. Should the tolerance requirements for the second level of information of the mask (tip mask) be very high the first level of information can be removed by anisotropicreactive ion etching. In a second step the tip is etched into the already existing silicon pedestal. This anisotropic etching step which uses an aqueous 37.5 wt % KOH solution at about 60° C. is discontinued when the 80 μm silicon dioxide discs are completely undercut. As the undercut etch rate of the afore-mentioned 37.5 wt % KOH solution at about 60° C. is about twice as high as the etch rate in (100) direction the complete undercut is obtained at an etch depth which roughly corresponds to about a quarter of the disc diameter. The etching conditions imply that the high concentration of the KOH solution is responsible for the low etch rate in (100) direction, compared with other directions. The etch temperature is not critical with respect to the etch rate ratio.

The complete undercut of the tip mask (second level of information of the silicon dioxide mask) results in a silicon tip with an orientation in the slow etching (100) direction, which tip is bounded by fast etching surfaces (see FIG. 4E of the previous example). Due to the sharp taper angle of the tip of about 45° the overetching results in a fast shortening of the tip. Therefore, the maximum overetching time has to be carefully tuned to the disc diameter.

The tip of this example has a height of about 20 μm and a radius of about <10 nm which is an excellent structure for obtaining high quality STM images.

For the STM profilometry the tips made in accordance with this invention may carry a metallic coating.

While the invention has been described with respect to selected examples thereof, it will be apparent to those skilled in the art that variations can be made thereto without departing from the spirit and scope of the present invention.

We claim:

1. Method of producing micromechanical sensors for the AFM/STM profilometry, which consist of a cantilever beam with a tip at its end and a mounting block at the opposite, comprising the following steps:
   bilaterally coating a wafer substrate with a layer of inorganic material;
   producing a mask for the desired cantilever beam pattern on the top side of the wafer and in the upper part of said layer; and a mask in said layer on the bottom side of the wafer;
   planarizing said cantilever beam pattern with photoresist;
   producing a mask for the desired tip in the area of the cantilever beam pattern, producing the desired tip using an etching step, and simultaneously transferring the cantilever beam pattern from the upper to the lower part of said layer; and
   removing the supporting wafer material by etching through the bottom side mask.

2. Method of producing micromechanical sensors for the AFM/STM profilometry, which consist of a cantilever beam with a tip at its end and a mounting block at the opposite, comprising the following steps:
   bilaterally coating a wafer substrate with a layer of inorganic material;
   producing a cantilever beam mask for the desired cantilever beam pattern on the top side of the wafer and in the upper part of said layer, and a mask in said layer on the bottom side of the wafer;
   producing a tip mask for the desired tip pattern in the area of the cantilever beam pattern and simultaneously transferring the cantilever beam pattern into a deeper level of said layer;
   transferring the cantilever beam pattern and tip pattern into the wafer substrate by:
   a) etching said layer to such a depth, that the areas of said layer abutting said cantilever beam mask are removed;
   b) anisotropic wet etching of the wafer substrate to a depth which corresponds to the desired cantilever beam thickness;
   c) removing of said cantilever beam mask and remaining areas of said layer by etching; and
   d) shaping a tip by anisotropic wet and undercut etching of said tip mask.

3. Method of claim 1, wherein the wafer substrate consists of monocrystalline silicon, and the layer on the top side of said wafer substrate is selected from the group consisting of silicon dioxide, silicon nitride, silicon carbide, diamond-like carbon, doped monocrystalline silicon and polycrystalline silicon.

4. Method of claim 1, wherein a silicon dioxide layer is thermally grown or deposited by chemical vapor deposition (CVD) to a layer thickness of about 10 μm on the top side of a silicon wafer and the respective silicon dioxide layer on the bottom side of said wafer is thermally grown to a layer thickness of about 1 to 2 $\mu^m$.

5. Method of claim 1, wherein an about 3 μm thick photoresist layer is applied to a silicon dioxide layer on the top side of said wafer, and, using a first photolithographic step, the desired cantilever beam pattern is defined in said photoresist layer, and the resulting pattern is transferred into the upper part of the silicon dioxide layer by reactive ion etching to a depth of about 3 μm with CF4 as etch gas and with a pressure in the range of about 1 to 10 μbar.

6. Method of claim 5, wherein with said first photolithographic step and the reactive ion etching rectangular openings are simultaneously made in the silicon dioxide layer on the bottom side of the wafer.

7. Method of claim 1, wherein an about 5 μm thick photoresist layer is applied to a structured silicon dioxide layer on the top side of the wafer, and using a second photolithographic step, the mask pattern for the tip is defined in said photoresist layer and using said mask pattern, the tip is shaped by reactive ion etching with CF4 as etch gas and with a pressure in the range of about 100 μbar.

8. Method of claim 7, wherein concurrently with the shaping of the tip, using the photoresist mask, the cantilever beam pattern is transferred into the lower part of silicon dioxide layer, using the cantilever beam pattern in the upper part of said layer as an 'intermediate mask'.

9. Method of claim 1, wherein the supporting silicon wafer material is removed from the bottom side by anisotropic wet etching through the bottom side mask with aqueous KOH solution.

10. Method of claim 1, wherein the tip is sharpened in an argon ion milling process.

11. Method of claim 2, wherein a silicon dioxide layer is thermally grown on both sides of a monocrystalline (100) silicon wafer substrate to a layer thickness of about 3 μm.

12. Method of claim 2, wherein the cantilever beam pattern defined in a first photolithographic step in a photoresist layer on silicon dioxide layer is transferred into the upper part of said silicon dioxide layer (43) by wet etching with 5:1 buffered hydrofluoric acid to a depth of about 0.3 μm.

13. Method of claim 2, wherein concurrently with the etching of the silicon dioxide layer on the top side rectangular patterns are etched to the corresponding depth into the silicon dioxide layer on the bottom side, and, after protecting the top side by a photoresist layer, the silicon dioxide remaining in said areas is removed by etching in 5:1 buffered hydrofluoric acid.

14. Method of claim 2, wherein the tip pattern defined in a second photolithographic step in a photoresist layer within the area of cantilever beam pattern is transferred into the silicon dioxide layer in said area by wet etching with 5:1 buffered hydrofluoric acid, and the cantilever beam pattern is simultaneously transferred into a deeper level of said layer.

15. Method of claim 2, wherein after removal of the silicon dioxide in the areas by wet etching with 5:1 buffered hydrofluoric acid the cantilever beam is anisotropically etched into the silicon wafer substrate using said mask and an aqueous KOH solution at about 80° C.

16. Method of claim 2, wherein subsequently to the etching of the silicon cantilever beam the silicon dioxide cantilever beam mask is removed by etching with 5:1 buffered hydrofluoric acid, and next the tip 410 is anisotropically etched into the silicon wafer substrate within the area of the cantilever beam using the tip mask and an aqueous KOH solution at about 60° C.

17. Method of claim 2, further comprising the steps of thinning down the silicon wafer substrate prior to the mask structure transfer into said silicon wafer substrate, and further during the etching of the silicon cantilever beam and the silicon tip by anisotropic etching from the bottom side of the wafer using the bottom side mask and an aqueous KOH solution at about 60° to 80° C.

18. Method of claim 2, wherein the silicon membrane remaining in the areas is removed from the bottom side of the wafer by reactive ion etching with $CF_4$ as etch gas and a pressure of about 10 ubar, thereby exposing the silicon cantilever beam with the tip as an integral part.

19. Method of claim 2, further comprising the steps of:

defining discs of a first diameter in a silicon dioxide layer on the top side of a silicon wafer substrate, which discs are to form the masks for the etching of pedestals into the silicon wafer substrate, using a first photolithographic step and etching;

defining discs of a second smaller diameter in the silicon dioxide layer overlying said discs of a first diameter and within the area or said discs, which discs are to form the masks for the etching of tips into the silicon wafer substrate, using a second photolithographic step and etching;

anisotropically etching the pedestals into the silicon wafer substrate, using the discs of the first diameter as masks and an aqueous solution of KOH (37.5 wt %) at about 60° C.;

removing the level of the masks for etching the pedestals by isotropic etching with 5:1 buffered hydrofluoric acid or by anisotropic reactive ion etching;

anisotropically etching the tips into the already existing silicon pedestals, using the discs of the second smaller diameter as masks and an aqueous solution of KOH (37.5 wt %) at about 60° C.

20. Method of claim 19, wherein discs of a diameter of 500 μm and subsequently discs of a diameter of 80 μm are defined in the silicon dioxide layer;

and pedestals are etched into the silicon wafer substrate to a depth of about 150 μm, using said 500 μm discs as masks, and subsequently tips into the pedestals, using said 80 μm discs as masks, and for a time sufficient for the complete undercut of said 80 μm discs.

* * * * *